(12) United States Patent
Swaroop et al.

(10) Patent No.: US 11,852,563 B2
(45) Date of Patent: Dec. 26, 2023

(54) FUEL LEAK DETERMINATION VIA PREDICTIVE MODELING

(71) Applicant: Wayne Fueling Systems LLC, Austin, TX (US)

(72) Inventors: Prem Swaroop, Lexington, MA (US); Atish Kamble, Arlington, MA (US); Bodhayan Dev, Marlborough, MA (US)

(73) Assignee: Wayne Fueling Systems LLC, Austin, TX (US)

( * ) Notice: Subject to any disclaimer, the term of this patent is extended or adjusted under 35 U.S.C. 154(b) by 449 days.

(21) Appl. No.: 17/027,529

(22) Filed: Sep. 21, 2020

(65) Prior Publication Data

US 2021/0404904 A1  Dec. 30, 2021

Related U.S. Application Data

(60) Provisional application No. 63/046,345, filed on Jun. 30, 2020.

(51) Int. Cl.
*G01M 3/18* (2006.01)
*G06F 3/04842* (2022.01)
*G06Q 10/04* (2023.01)
*G06Q 50/18* (2012.01)
(Continued)

(52) U.S. Cl.
CPC ............. *G01M 3/186* (2013.01); *B67D 7/085* (2013.01); *G01F 25/15* (2022.01); *G06F 3/04842* (2013.01); *G06Q 10/04* (2013.01); *G06Q 50/18* (2013.01); *G01F 25/13* (2022.01)

(58) Field of Classification Search
None
See application file for complete search history.

(56) References Cited

U.S. PATENT DOCUMENTS

| 5,400,253 A | 3/1995 | O'Connor |
| 6,092,410 A | 7/2000 | Kaehler et al. |
| 6,996,485 B2 | 2/2006 | Payne |

(Continued)

FOREIGN PATENT DOCUMENTS

| AU | 2012244083 A1 | 11/2012 |
| CN | 108108832 B | 10/2018 |

(Continued)

OTHER PUBLICATIONS

International Search Report and Written Opinion for International Patent Application No. PCT/US21/73085, dated Apr. 7, 2022, 12 pages.

(Continued)

*Primary Examiner* — Paul M. West
*Assistant Examiner* — Mark A Shabman
(74) *Attorney, Agent, or Firm* — MINTZ LEVIN COHN FERRIS GLOVSKY AND POPEO, PC (57) ABSTRACT

Data characterizing a fuel storage facility can be received from one or more of a plurality of sensors disposed in the fuel storage facility. A fuel leak prediction for the fuel storage facility can be determined by a server, based on the received data, and further based on at least one predictive model that predicts whether a fuel leak exists in the fuel storage facility. The fuel leak prediction can be provided by the server. Related apparatus, systems, methods, techniques, and articles are also described.

31 Claims, 6 Drawing Sheets

(51) Int. Cl.
*B67D 7/08* (2010.01)
*G01F 25/10* (2022.01)

(56) References Cited

U.S. PATENT DOCUMENTS

| | | | |
|---|---|---|---|
| 9,354,091 | B2 | 5/2016 | Vaissiere |
| 9,558,453 | B1 | 1/2017 | Chaudhary et al. |
| 10,606,285 | B2 | 3/2020 | Ding |
| 2002/0049549 | A1 | 4/2002 | Rogers et al. |
| 2008/0125930 | A1* | 5/2008 | Johnson ............ F02C 9/46 701/9 |
| 2008/0295568 | A1 | 12/2008 | Nanaji et al. |
| 2009/0248325 | A1* | 10/2009 | Humphrey ....... G06Q 10/08355 702/55 |
| 2013/0199262 | A1* | 8/2013 | Nielson ............ G01F 25/10 702/50 |
| 2017/0074706 | A1* | 3/2017 | Heide ............... G01F 15/14 |
| 2018/0031399 | A1* | 2/2018 | Heide ............... G01F 1/58 |
| 2018/0037451 | A1* | 2/2018 | Johnson ............ G01F 22/00 |
| 2018/0044159 | A1 | 2/2018 | Crouse et al. |
| 2018/0300639 | A1 | 10/2018 | Abbas |
| 2021/0403312 | A1 | 12/2021 | Swaroop et al. |

FOREIGN PATENT DOCUMENTS

| | | |
|---|---|---|
| WO | 2006032873 A1 | 3/2006 |
| WO | 2022006090 A1 | 1/2022 |
| WO | 2022006110 A1 | 1/2022 |

OTHER PUBLICATIONS

International Search Report and Written Opinion received for Application No. PCT/US2021/039592 dated Oct. 21, 2021, 13 pages.

International Search Report and Written Opinion received for Application No. PCT/US2021/039618, dated Oct. 22, 2021, 14 Pages.

* cited by examiner

FIG. 1

Parameter Window

| Upload File | Browse | No file selected |

Number of days: 60

Number of breakpoints: 25

Threshold on daily variance (raw data): 1000

Loss threshold (model prediction): 2

Gain threshold (model prediction): 15

Zero error: 0

☐ Test tanks

↓ Download Results

→ Logout

— 202

List of Tanks

Show | 10 ▼ | entries          Search: [          ]

| # | STTK ⇅ | DLG ⇅ | Start_date ⇅ | End_date ⇅ |
|---|--------|-------|--------------|------------|
| 1 | 13571_1 | 137.27 | 2019-01-01 | 2020-02-12 |
| 2 | 13571_2 | 122.163 | 2019-01-01 | 2020-02-12 |
| 3 | 13571_3 | 44.396 | 2019-01-01 | 2020-02-12 |
| 4 | 13571_4 | 25.447 | 2019-01-01 | 2020-02-12 |
| 5 | 15849_1 | 7.803 | 2019-01-01 | 2020-02-12 |
| 6 | 15849_2 | 2.009 | 2019-01-01 | 2020-02-12 |
| 7 | 15849_3 | 1.407 | 2019-01-01 | 2020-02-12 |
| 8 | 15849_4 | 1.68 | 2019-01-01 | 2020-02-12 |
| 9 | 15849_5 | 1.542 | 2019-01-01 | 2020-02-12 |
| 10 | 17569_1 | 28.204 | 2019-01-01 | 2020-02-12 |

Showing 1 to 10 of 10 entries          Previous | 1 | Next

| | Model fixed | Loss.threshold | Gain.threshold | No.fo.tanks |
|---|---|---|---|---|
| 1 | 30day | 2 | 15 | 1277 |
| 2 | 60day | 2 | 15 | 769 |
| 3 | 60day relaxed | 10 | 50 | 557 |
| 4 | 30day_highrelaxed | 20 | 90 | 346 |
| 5 | 60day_highrelaxed | 20 | 90 | 269 |
| 6 | Inc | xx | xx | 103 |

FUEL LEAK DETERMINATION VIA PREDICTIVE MODELING

CROSS-REFERENCE TO RELATED APPLICATIONS

This application claims priority to U.S. Provisional Patent Application No. 63/046,345, filed Jun. 30, 2020, and entitled "FUEL LEAK DETERMINATION VIA PREDICTIVE MODELING," which is incorporated herein by reference in its entirety.

FIELD

Systems and methods are provided for fuel leak determination via predictive modeling. Related apparatus, systems, techniques, and articles are also described.

BACKGROUND

Wetstock management is part of day-to-day operations of a fuel storage facility. Typically, wetstock management can involve the monitoring of fuel stock at a fuel storage facility using a variety of measurement devices, such as automatic tank gauges (ATGs), fuel leak detection sensors, magnetostrictive probes, and so forth, evaluating measurements to detect abnormal, and often unsafe, events affecting the fuel stock (e.g., fuel losses, fuel excesses, tank defects, operational issues, etc.), and performing corrective actions as necessary.

Traditionally, wetstock measurements can be evaluated manually by a storage facility operator. The operator can be responsible for monitoring the measurements in order to identify anomalies and respond appropriately. However, the practice of relying upon humans to manually monitor large volumes of sensor data can be error prone, potentially resulting in the failure to detect and resolve problems at an early stage. Such failure, in the context of wetstock management, could produce catastrophic consequences such as environmental contamination, loss of revenue, damaged reputation, and public health risks.

The U. S. Environmental Protection Agency (EPA) specifies performance standards for methods of leak detection in Underground Storage Tanks (USTs). Owners and operators of USTs must demonstrate that the leak detection methods, also referred to as the Statistical Inventory Reconciliation (SIR) methods, that they use meet such specified standards. EPA requires that the SIR method must be able to detect a leak of 0.1 gallon per hour (gal/hr) with a probability of detection (PD) of at least 95 percent, while operating at a probability of false alarm (PFA) of no more than 5 percent.

However, currently applied methods of leak detection are vulnerable to errors associated with characteristics of individual USTs, UST volumetric calibrations, thermal expansion of fluid due to variations in ambient conditions, seasonal effects, short-deliveries (or potential frauds), and short-sales (or leakage in dispenser nozzles, theft), and the like. Being largely statistical in their nature, these methods do not track the errors at all stages of data collection and analysis. In addition, at present, data pertaining to fuel stored in USTs is recorded at the end of each day, and thus there is limited visibility of the sources of error in the leak detection process.

SUMMARY

Systems and methods are provided for fuel leak determination via predictive modeling. Related apparatus, systems, techniques, and articles are also described.

In one aspect, data characterizing a fuel storage facility can be received from one or more of a plurality of sensors disposed in the fuel storage facility. A fuel leak prediction for the fuel storage facility can be determined by a server, based on the received data, and further based on at least one predictive model that predicts whether a fuel leak exists in the fuel storage facility. The fuel leak prediction can be provided by the server.

One or more of the following features can be included in any feasible combination. For example, the at least one predictive model can include a predetermined calibration parameter for the fuel storage facility, a physical model for the fuel storage facility, and an error model indicative of at least one degree of error in the data. For example, the determining of the fuel leak prediction can further include determining, based on the received data, the predetermined calibration parameter for the fuel storage facility, the physics model, and an optimization of the error model, a predicted fuel leakage rate for the fuel storage facility, and determining the fuel leak prediction based on whether the predicted fuel leakage rate exceeds a predetermined threshold. For example, the fluid balance model can determine a predicted fuel level for the fuel storage facility based on the received data. For example, a second fuel leak prediction for the fuel storage facility can be determined based on a second fluid balance model and a second predetermined threshold, the second fluid balance model based on the fluid balance model and the second predetermined threshold greater than the predetermined threshold. For example, the one or more of the plurality of sensors can include any one of a dipstick, an automated tank gauge, a fuel leak detection sensor, a magnetostrictive probe, a point of sale device, a forecourt controller, a back office system, and a fuel dispenser. For example, the server can be communicatively coupled to the one or more of the plurality of sensors. For example, the fuel leak prediction can be a daily fuel leak prediction. For example, the fuel leak prediction can be provided to a graphical user interface of a display communicatively coupled to the at least one data processor, and the graphical user interface can be configured to present a visual characterization of the fuel leak prediction on the display. For example, the fuel leak prediction can be provided to an automatic tank gauge for display to a user. For example, the fuel leak prediction can be determined at a repeatable time interval. For example, the physics model can be a fluid balance model. For example, the determining can further be based on mathematical programing and can include maximizing or minimizing a function characterized by the physics model and by at least varying input values of the function, the input valves characterizing the received data, and computing an output value of the function, the output value characterizing the predicted fuel leakage rate. For example, a source of the fuel leak can be determined based on the predicted fuel leakage rate, the fuel leak prediction, and the received data.

In another aspect, a system is provided and can include at least one data processor and memory storing instructions configured to cause the at least one data processor to perform operations described herein. The operations can include receiving, from one or more of a plurality of sensors disposed in a fuel storage facility, data characterizing the fuel storage facility, determining, based on the received data, a fuel leak prediction for the fuel storage facility, the determining further based on at least one predictive model that predicts whether a fuel leak exists in the fuel storage facility, and providing the fuel leak prediction.

One or more of the following features can be included in any feasible combination. For example, the at least one predictive model can include a predetermined calibration parameter for the fuel storage facility, a physical model for the fuel storage facility, and an error model indicative of at least one degree of error in the data. For example, the determining of the fuel leak prediction can further include determining, based on the received data, the predetermined calibration parameter for the fuel storage facility, the physics model, and an optimization of the error model, a predicted fuel leakage rate for the fuel storage facility, and determining the fuel leak prediction based on whether the predicted fuel leakage rate exceeds a predetermined threshold. For example, the fluid balance model can determine a predicted fuel level for the fuel storage facility based on the received data. For example, the operations can further include determining a second fuel leak prediction for the fuel storage facility based on a second fluid balance model and a second predetermined threshold, the second fluid balance model based on the fluid balance model and the second predetermined threshold greater than the predetermined threshold. For example, the one or more of the plurality of sensors can include any one of a dipstick, an automated tank gauge, a fuel leak detection sensor, a magnetostrictive probe, a point of sale device, a forecourt controller, a back office system, and a fuel dispenser. For example, the at least one data processor can be communicatively coupled to the one or more of the plurality of sensors. For example, the fuel leak prediction can be a daily fuel leak prediction. For example, the fuel leak prediction can be provided to a graphical user interface of a display communicatively coupled to the at least one data processor, and the graphical user interface can be configured to present a visual characterization of the fuel leak prediction on the display. For example, the fuel leak prediction can be provided to an automatic tank gauge for display to a user. For example, the operations can further include determining the fuel leak prediction at a repeatable time interval. For example, the physics model can be a fluid balance model. For example, the determining can further be based on mathematical programing and can include maximizing or minimizing a function characterized by the physics model and by at least varying input values of the function, the input valves characterizing the received data, and computing an output value of the function, the output value characterizing the predicted fuel leakage rate. For example, the operations can further include determining a source of a fuel leak based on the predicted fuel leakage rate, the fuel leak prediction, and the received data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The current subject matter includes an SIR methodology that, in some implementations, can meet stringent EPA criteria for leak detection in underground storage tanks at a fuel storage facility. The methodology can accurately track underground storage tank volumetric calibrations, thermal expansion of fluid due to variations in ambient conditions, seasonal effects, short-deliveries (or potential frauds), and short-sales (or leakage in dispenser nozzles, theft), as well as account for the error in leak detection these conditions represent. This methodology can include physics based fluid balancing that uses modeling of inventory and predictive modeling techniques to reduce sources of error in leak detection and provide a predicted leak rate with a probability of detection and probability of false alarm that can fall within EPA's stringent requirements.

Physics based fluid balancing can include predicting a raw fuel leakage rate based on starting and ending levels of fuel in the fuel storage facility over a given period of time and accounting for sales of fuel from the fuel storage facility and deliveries of fuel to the fuel storage facility during the given period of time. By employing physics based fluid balancing and predictive modeling techniques that account for sources of error and discrepancies that the physics based fluid balancing cannot account for by itself, some implementations of the SIR methodology account for the fuel in each tank and accurately predicts the amount of daily leak-rate averaged over a time period, for example, a 30-day period or a 60-day period.

Figure 1:
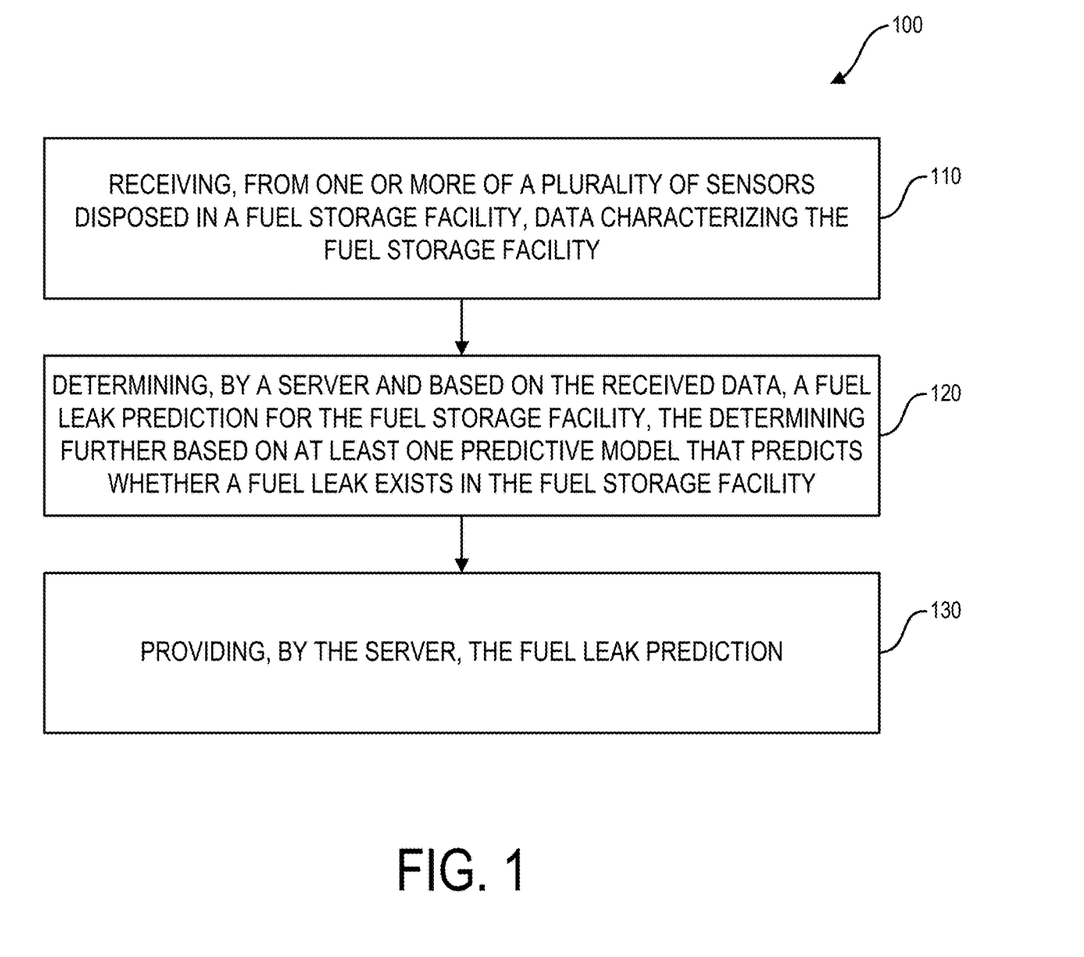
FIG. 1 is a process flow diagram illustrating an example process of some implementations of the current subject matter that can provide for improved fuel leak detection in a fuel storage facility.

FIG. 1 is a process flow diagram illustrating an example process 100 of some implementations of the current subject matter that can provide for improved fuel leak detection in a fuel storage facility.

At 110, data characterizing a fuel storage facility can be received from one or more of a plurality of sensors disposed proximate the fuel storage facility. In some implementations, the one or more of the plurality of sensors can include any one of a dipstick, an automated tank gauge, a fuel leak detection sensor, a magnetostrictive probe, a point of sale device, a forecourt controller, a back office system, and a fuel dispenser, each of which can be in operable communication with the fuel storage facility.

In some implementations, the fuel storage facility can be an underground fuel storage tank at a fueling station that is configured to supply fuel dispensers at the fueling station with fuel. In some implementations, the fuel storage facility can comprise a plurality of underground fuel storage tanks, each located at the fueling station and configured to supply fuel dispensers at the fueling station with fuel. In some implementations, the fuel storage facility can be located at a separate location from the fueling station.

In some implementations, the data can be received at a server. In some implementations, the server can include a wetstock management server communicatively coupled to the plurality of sensors that can collect the data. The server can be a remote, e.g., cloud-based, server located away from the fuel storage facility and/or the fueling station, however in some implementations the server can be located at the fuel storage facility and/or the fueling station. In some embodiments, the data received from the one or more of the plurality of sensors can be collected by an intermediary data collection device (not shown), such as an IoT device, located on-site, and the data collection device can transmit the collected data to the server for processing.

In some implementations, the data received from the plurality of sensors can characterize one or more aspects of the fuel storage facility for a designated period of time (e.g., a day). For example, in some implementations, the data can characterize an amount of fuel present in the fuel storage facility at a start time of the designated period of time, an amount of fuel added to the fuel storage facility by the delivery of fuel from a fuel supplier, an amount of fuel removed from the fuel storage facility by the sale of fuel to a customer, an amount of fuel present in the fuel storage facility at an end time of the designated period of time, a capacity of the fuel storage facility, a type of fuel stored in the fuel storage facility, a grade of fuel stored in the fuel storage facility, ambient weather, temperature, and/or pressure conditions at the fuel storage facility, and a type of sensor disposed at the fuel storage facility. In some implementations, when the fuel storage facility comprises a plurality of fuel tanks, the data can characterize whether the plurality of fuel tanks are in fluid communication with some or all of each other, and the number of fuel tanks that are in fluid communication with one another.

At 120, a fuel leak prediction for the fuel storage facility can be determined based on the received fuel data. The fuel leak prediction can be determined based on at least one predictive model that predicts whether a fuel leak exists in the fuel storage facility. In some implementations, the at least one predictive model can include a predetermined calibration parameter for the fuel storage facility, a physics model for the fuel storage facility, and an error model indicative of at least one degree of error in the data. The predetermined calibration parameter can include one or more characteristics of the fuel storage facility. In some implementations, the predetermined calibration parameter can be approximated, for use by the at least one predictive model, as a piece-wise linear function having a plurality of predetermined breakpoints, and a slope between each of the predetermined breakpoints can be determined by optimization of the error model, however, in some implementations, the predetermined calibration parameter can be approximated using other techniques known to persons of skill in the art. In some implementations, a number of the predetermined breakpoints can also be determined by optimization of the error model. In some implementations, the number of predetermined breakpoints can be determined using machine learning techniques that involve, for example, k-means and gradient boosted trees. In some implementations, the predetermined calibration parameters can include, use, or be based on, data characterizing the fuel storage facility that has been previously obtained.

In some implementations, the physics model can include a fluid balance model that determines a predicted fuel level for the fuel storage facility based on the received data. For example, in some implementations, the fluid balance model can predict a starting level of fuel in the fuel storage facility for a given day based on the starting level of fuel in the fuel storage facility on the previous day, the ending level of fuel in the fuel storage facility on the previous day, the amount of fuel sold from the fuel storage facility during the previous day, and the amount of fuel delivered to the fuel storage facility during the previous day. In some implementations, the fluid balance model can predict a starting level of fuel in the fuel storage facility for a given day based on the starting level of fuel in the fuel storage facility for each day of a period of days under consideration, on the ending level of fuel in the fuel storage facility for each day of the period of days under consideration, on the amount of fuel sold from the fuel storage facility for each day of the period of days under consideration, and on the amount of fuel delivered from the fuel storage facility for each day of the period of days under consideration.

In some implementations, the at least one predictive model can account for various errors and discrepancies between the starting level of fuel in the fuel storage facility for a given period of time (e.g., a day) and the ending level of fuel in the fuel storage facility for the given period of time that cannot otherwise be accounted for by sales of fuel from the fuel storage facility during the given period of time and deliveries of fuel from the fuel storage facility during the given period of time. Such discrepancies can include a leakage of fuel from the fuel storage facility during the given period of time, discrepancies in fuel sales from the fuel storage facility and in fuel deliveries to the fuel storage facility resulting from calculation/measurement errors or theft of fuel, and the like. In some implementations, the at least one predictive model can account for the errors and discrepancies for a series of periods of time (e.g., a series of days). In some implementations, the at least one predictive model can account for the aforementioned errors and discrepancies by the use of the error model. The error model can include one or more optimizer functions that can be used in conjunction with the physics model by the at least one predictive model to minimize various error correction terms for use in determining a predicted fuel leakage rate with a high degree of accuracy. For example, in some implementations, the error model can minimize a deviation, from 1, of an average correction factor for any multiplicative errors introduced in determining the amount of fuel sales from the fuel storage facility on a given day, and a deviation, from 1, of an average correction factor for any additive errors introduced in determining the amount of fuel delivered on the given day. In some implementations, the error model can minimize a deviation, from 0, of an average leakage value for the fuel storage facility. In some implementations, the error model can minimize a weighted average of each of these deviations and further include error contributions associated with additive correction factors. In some implementations, the error model can minimize a cost function that includes the one or more optimizer functions and that is based on the number of predetermined breakpoints, a number of days of data under consideration (e.g., 30 or 60), a number of days, during the time period under consideration, during which deliveries of fuel were provided to the fuel storage facility, a fuel delivery error correction weight term, a predicted fuel leakage rate weight term, and a number of days, during the time period under consideration, during which sales of fuel were made from the fuel storage facility. In some implementations, the error model can solve one or more linear equations using the minimized cost function and thereby evaluate an average daily leak rate for the time period under consideration. In some implementations, the error model can determine the predicted fuel leakage rate for the time period under consideration by calculating the median of the average daily leak rate for the time period under consideration. In some implementations, the error model can attribute one or more portions of the predicted fuel leakage rate to the aforementioned sources of error/discrepancies and determine a source of a fuel leak based on a magnitude of the one or more portions of the predicted fuel leakage rate. In some implementations, the determination of the source of the leak can be based on the predicted fuel leakage rate, the fuel leak prediction, and the received data.

In some implementations, the determination of the fuel leak prediction can be further based on mathematical programing and can include maximizing or minimizing a function characterized by the physics model and by at least varying input values of the function that characterizes the received data, and computing an output value of the function that characterizes the predicted fuel leakage rate. In some implementations, the fuel leak prediction can be determined at one or more repeatable time intervals. In some implementations, the fuel leak prediction can be a daily fuel leak prediction.

In some implementations, the at least one predictive model can receive user-provided parameters for use in determining the predicted fuel leakage rate. For example, the user-provided parameters can include the number of days of data for consideration by the at least one predictive model, such as 30 days, 60 days, or any period of time for which a predicted fuel leakage rate and/or fuel leak prediction is desired. In some implementations, where the number of days of data for consideration by the at least one predictive model is 60 days, the at least one predictive model calculates 30-day predicted fuel leakage rates for two data sets, each corresponding to a 30-day period within the 60-day data set. To account for errors in the data, the at least one predictive model can determine a 60-day predicted fuel leakage rate based on the difference between the 30-day predicted fuel leakage rates. The periods of time corresponding to the data sets considered and analyzed by the models may be of varying lengths, and the periods of time need not be contiguous. For example, a first data set can comprise data collected over a 45-day period, and a second data set can comprise data collected over a 45-day period in the same season of the preceding year. In some implementations, the user-provided parameters can also include various data quality parameters which can be used by the at least one predictive model to improve the quality of the received data that is used for the fuel leak prediction. For example, the data quality parameters can include indications to ignore or remove portions of the data if the predicted fuel leakage rate, as determined by the at least one predictive model, exceeds a certain value. In addition, in some implementations, the data quality parameters can include an artificially-induced leakage parameter that can be used by the at least one predictive model as an accuracy benchmark against the predicted fuel leakage rate determined by the at least one predictive model. In some implementations, the data quality parameters can include a parameter for a threshold on leakage recovered, which can be set at, for example, approximately 85-90% of the artificially-induced leakage parameter.

In some implementations, the user-provided parameters can also include error model parameters that can influence the operating characteristics of the error model. For example, in some implementations, the error model parameters can include the fuel delivery error correction weight term, the predicted fuel leakage rate weight term, and/or upper/lower bounds for aspects of the predetermined calibration parameter.

In addition, in some implementations, when the user-provided parameters include a selection of 60 days as the number of days of data for consideration by the at least one predictive model in determining the fuel leak prediction, the user-provided parameters can further include (1) a benchmark parameter for use by the at least one predictive model to adjust the predicted fuel leakage rate and thereby account for user-defined zero error/baseline correction, (2) a temperature-adjusted parameter that instructs the at least one predictive model to utilize temperature-adjusted stock levels, based on the received data, in determining the predicted fuel leakage rate, and/or (3) a volumetric expansion coefficient parameter which defines the coefficient of volumetric expansion for the fuel located at the fuel storage facility for use by the at least one predictive model in determining the predicted fuel leakage rate.

In some implementations, the determining of the fuel leak prediction can be based on whether the predicted fuel leakage rate exceeds one or more predetermined thresholds. For example, in some implementations, the user-provided parameters can include various predetermined thresholds for the predicted fuel leakage rate that can be used by the at least one predictive model to determine the fuel peak prediction. For example, the user-provided parameters can include a first predetermined threshold for the predicted fuel leakage rate, and the at least one predictive model can determine a fuel leak prediction of a "tight" (e.g., non-leaking) fuel storage facility when the predicted fuel leakage rate is lower than the first predetermined threshold. Similarly, in another example, the user-provided parameters can include a second predetermined threshold for the predicted fuel leakage rate that is higher than the first predetermined threshold, and the at least one predictive model can determine a fuel leak prediction of a "leaking" fuel storage facility when the predicted fuel leakage rate is higher than the first predetermined threshold and lower than the second predetermined threshold.

Similarly, in another example, the user-provided parameters can include a third predetermined threshold for the predicted fuel leakage rate that is higher than the second predetermined threshold, and the at least one predictive model can determine a fuel leak prediction of "inconclusive due to high predicted fuel leakage rate" when the predicted fuel leakage rate exceeds the third predetermined threshold. Such a prediction can have the effect of providing an alert to an end user that there is an issue with one or more of the plurality of sensors, or, if there is no issue with any of the plurality of sensors, that the fuel storage facility has been leaking fuel at an alarmingly high rate.

Figure 2A:
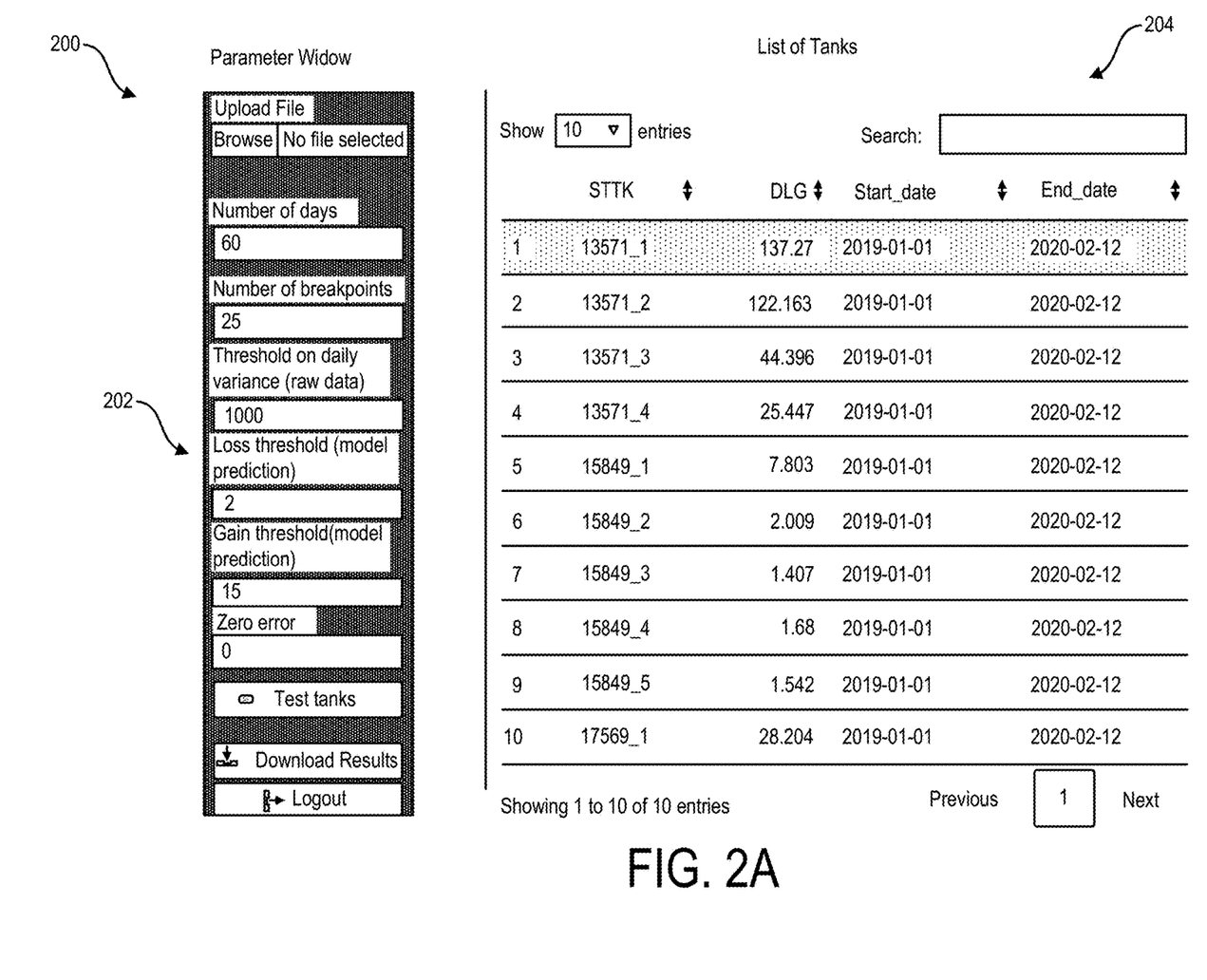
FIG. 2A is a first view of portions of an exemplary user interface implemented by the example process of FIG. 1.

At 130, the fuel leak prediction can be provided by the server. In some implementations, the fuel leak prediction can be provided to an automatic tank gauge for display to a user. In some implementations, the fuel leak prediction and/or the predicted fuel leakage rate can be provided by the server to a graphical user interface of a display communicatively coupled to the server, and, in some implementations, the graphical user interface can be configured to present a visual characterization of the fuel leak prediction and/or the predicted fuel leakage rate on the display. An example of such a graphical user interface is shown in FIG. 2A as user interface 200. As shown, user interface 200 can include a parameter window 202 in which a variety of user-provided parameters, such as the number of days under consideration (e.g., 30 days or 60 days), the number of breakpoints in the linear piecewise function that approximates the tank calibration chart, daily variance thresholds, first and second predetermined thresholds for establishing a leak prediction, and the like. The user interface 200 can also include a tank listing 204 which provides predicted fuel leakage rates for each tank in the fuel storage facility for the user-provided number of days under consideration. The user interface 200 can also retrieve historical predicted fuel leakage rates that can be stored on the server for display in the tank listing, and the user can interact with the tank listing 204 to select or deselect tanks for analysis by the at least one predictive model.

Figure 2B:
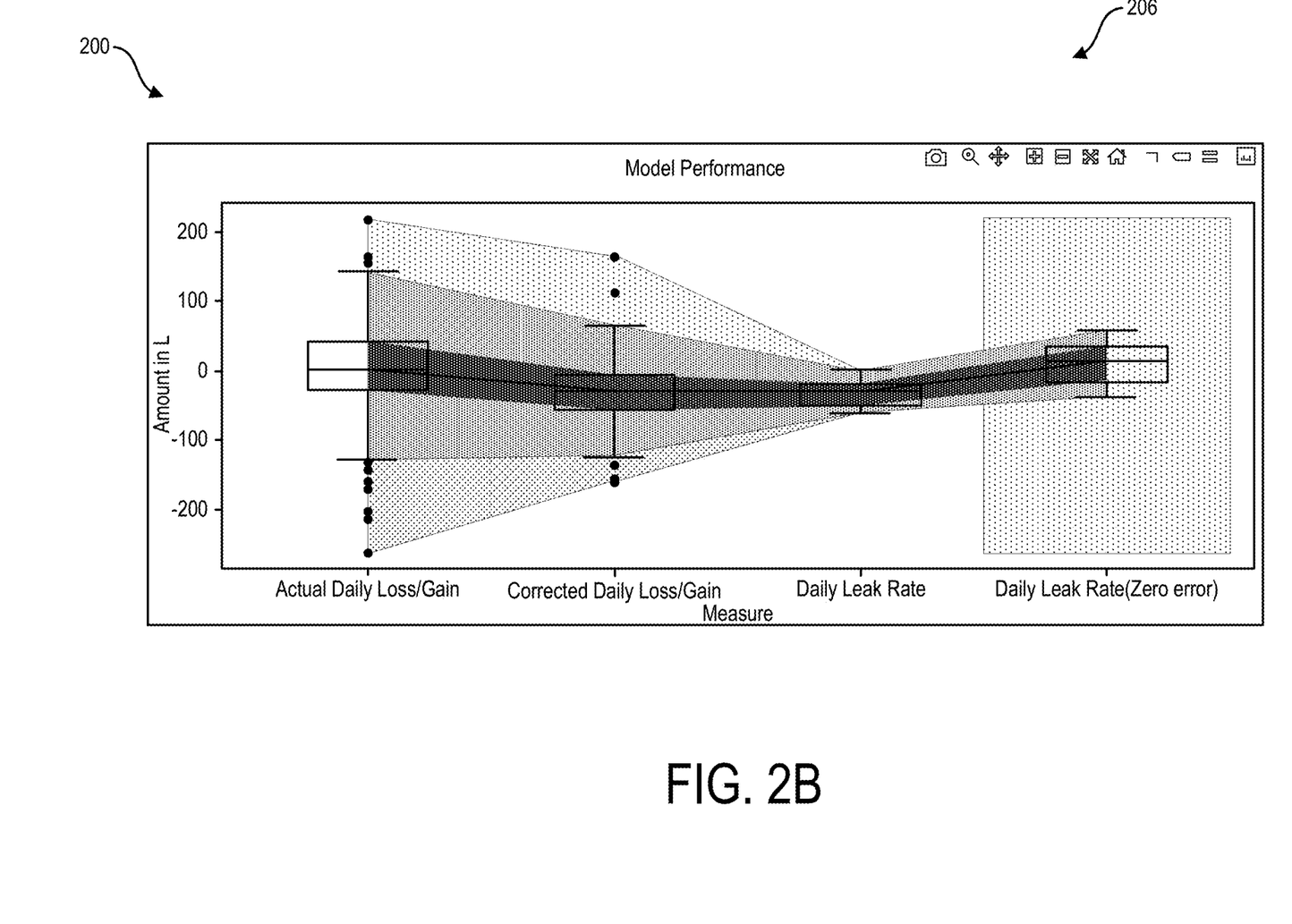
FIG. 2B is a second view of portions of an exemplary user interface implemented by the example process of FIG. 1.

FIG. 2B shows a model performance window 206, which provides a graphical depiction of the predicted fuel leakage rate as determined by the at least one predictive model and a variety of other models. The model performance window 206 can also provide a corrected predicted fuel leakage rate, which, in some implementations, can be based on the predicted fuel leakage rate but is modified to account for any data processing errors or statistical noise introduced during the execution of the at least one predictive model.

In some implementations, the server can monitor these data processing errors and/or the level of statistical noise introduced during the execution of the at least one predictive model and determine one or more performance metrics for the at least one predictive model. In some implementations, the server can, with the use of machine learning and/or artificial intelligence techniques, determine a recommended model of the at least one predictive model to use in determining the predicted fuel leakage rate and the fuel leak prediction. For example, the server can provide recommendations for such user-provided parameters as, the number of breakpoints in the linear piecewise function that approximates the tank calibration chart, daily variance thresholds, first and second predetermined thresholds for establishing a leak prediction, and the like. In making this determination, the server can assess the determined performance metrics and base the determined recommendation on its review of the performance metrics. In some implementations, the server can, with the use of machine learning and/or artificial intelligence techniques, provide recommended user-provided parameters, for display in the user interface 200, that correspond to the recommended model of the at least one predictive model and that are based on the review of the performance metrics. By providing the model and parameter recommendations, the server and user interface 200 provide the ability to obtain predicted fuel leakage rates and fuel leak predictions for each tank at a given fuel storage facility with improved accuracy and reliability as compared to existing methods.

In some implementations, the model performance window 206 can also provide one or more statistical values for the predicted fuel leakage rate as determined by the at least one predictive model, such as a minimum value of the predicted fuel leakage rate, a lower limit of the predicted fuel leakage rate, a $25^{th}$ percentile value of the predicted fuel leakage rate, a median of the predicted fuel leakage rate, a $75^{th}$ percentile of the predicted fuel leakage rate, an upper limit of the predicted fuel leakage rate, a maximum value of the predicted fuel leakage rate, and a measure of the root mean squared errors (RMSE) from zero.

In some implementations, the predicted fuel leakage rates for each tank at a fuel storage facility can be further analyzed to account for variability between the tanks and provide improved visibility of the accuracy of the predicted fuel leakage rates. For example, in an exemplary method of further analyzing the predicted fuel leakage rates, predicted fuel leakage rates based on a week of data from each season (to adjust for seasonal variations in the data) and determined based on default predetermined thresholds (e.g., the first, second, and third predetermined thresholds discussed above) and other user-provided parameters can be provided to the server for further processing. In some implementations, the server can assess the predicted fuel leakage rates and divide the tanks into subsets based on the predicted fuel leakage rates. For example, the tanks with predicted fuel leakage rates that are statistically well below the maximum across the data set can be classified as "low leak" tanks, and the remainder can be classified as "high leak" tanks.

In some implementations, the server can iteratively execute the at least one predictive model on some or all of the received data, with varying predetermined thresholds and model configurations applied, to provide a basis of comparison of fuel leak prediction performance under differing predetermined thresholds and model configurations for a given set of tanks at a fuel storage facility. For example, the server can execute the at least one predictive model, in the 30-day configuration and with default predetermined thresholds, on the data and determine the tanks for which the at least one predictive model was able to determine a fuel leak prediction of "tight". The server can also determine the tanks for which the at least one predictive model was not able to determine a fuel leak prediction of "tight," and re-execute the at least one predictive model, this time in the 60-day configuration with the same default predetermined thresholds, on that subset of the data that pertains to the tanks for which a fuel leak prediction of "tight" was not determined.

The server can then, using the results of the re-execution, determine the tanks for which the at least one predictive model was not able to determine a fuel leak prediction of "tight," during this re-execution. The server can then again re-execute the at least one predictive model on the data corresponding to the set of tanks for which the at least one predictive model was unable to determine a fuel leak prediction of "tight" in the 60-day/default predetermined threshold configuration, but this time using the 60-day configuration and relaxed predetermined thresholds that are less stringent than the default predetermined thresholds.

The server can similarly again determine the tanks for which the at least one predictive model was unable to determine a fuel leak prediction of "tight," and iteratively re-execute the at least one predictive model, in the 30-day configuration and with further relaxed predetermined thresholds that are less stringent than the relaxed predetermined thresholds, on the data corresponding to the tanks not identified in the previous execution of the model as "tight" and determine the tanks for which the at least one predictive model was unable to determine a fuel leak prediction of "tight" based on this most recent execution.

The server can re-execute the least one predictive model, in the 60-day configuration and using the further relaxed predetermined thresholds, on the data corresponding to the tanks not identified in the previous execution of the model as "tight" and determine a residual set of tanks for which the at least one predictive model was unable to determine a fuel leak prediction of "tight" remains. This final set of tanks can be classified by the at least one predictive model as "inconclusive" (e.g., the server was unable to determine a fuel leak prediction for the tanks).

Figure 2C:
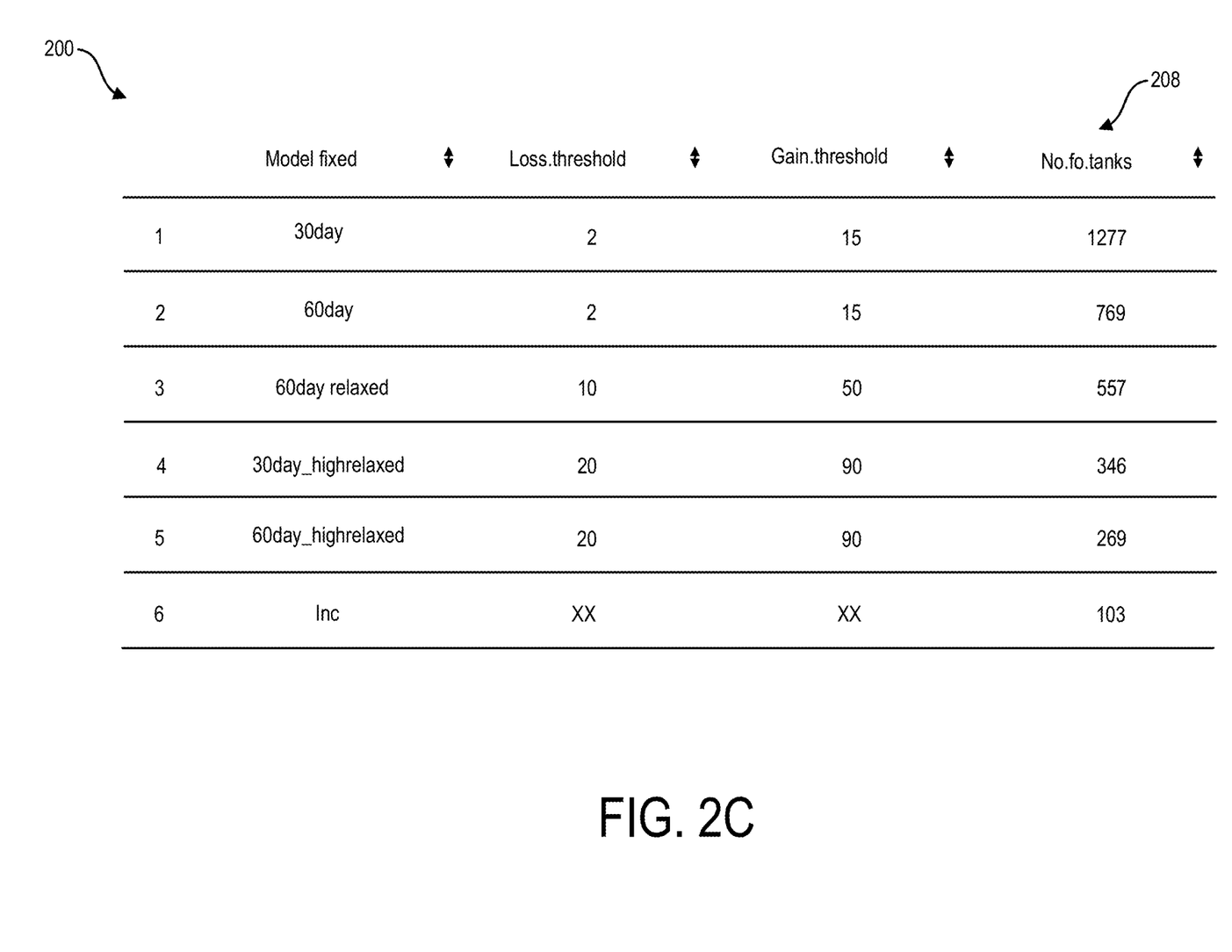
FIG. 2C is a third view of portions of an exemplary user interface implemented by the example process of FIG. 1.

The server can then provide, to the graphical user interface 200, a chart 208 (an example of which is shown in FIG. 2C) that indicates the number of tanks identified as "tight" during execution of the at least one predictive model in each of the aforementioned configurations. The chart 208 also shows the precise predetermined thresholds used during each execution of the model. As such, the server and the graphical user interface can provide added visibility to the performance of the at least one predictive model for a variety of conditions for a given set of tanks at a fuel storage facility.

Figure 3:
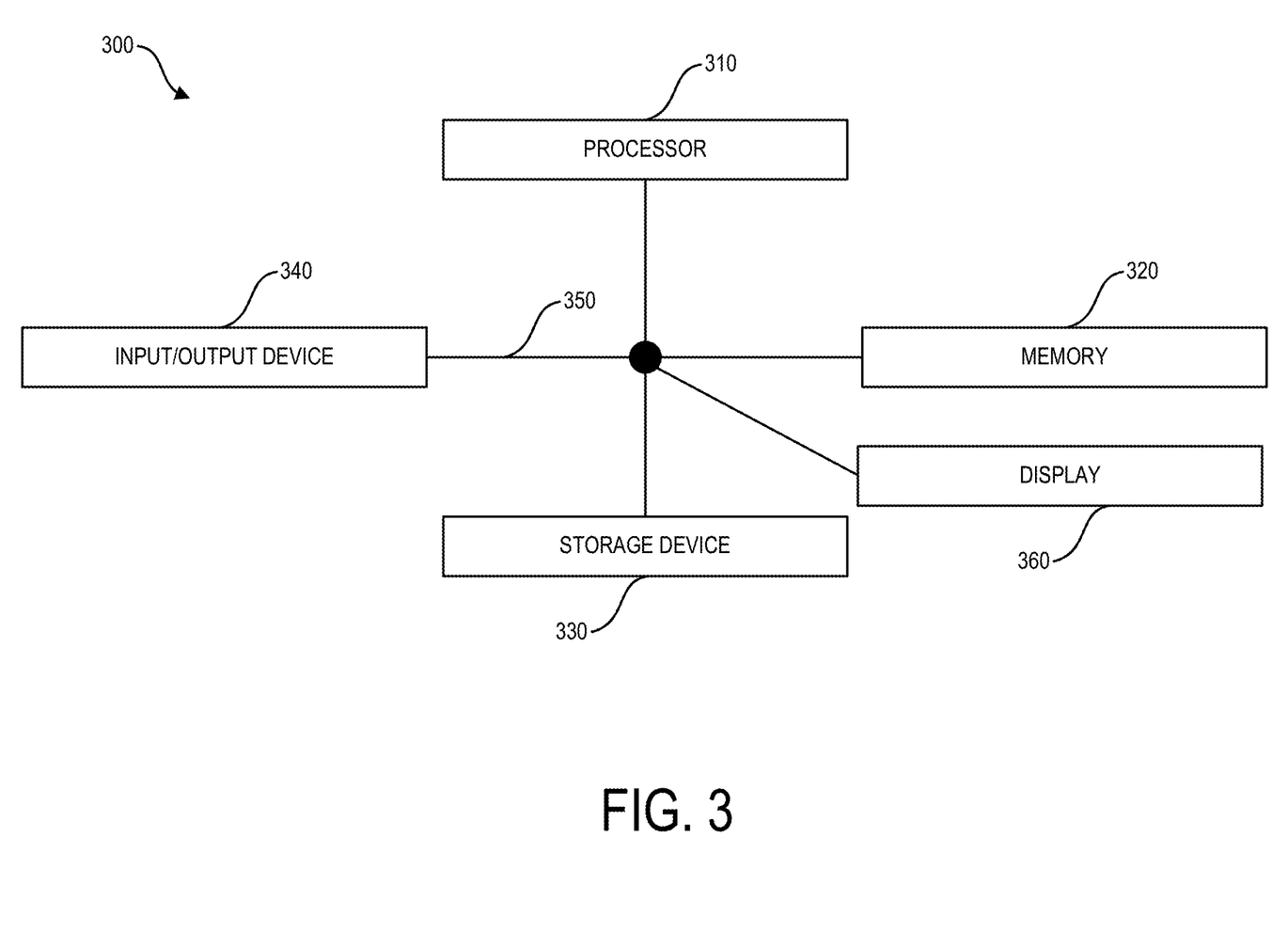
FIG. 3 is a schematic diagram of an exemplary system for implementing the current subject matter, as shown and described herein.
Figure 4:
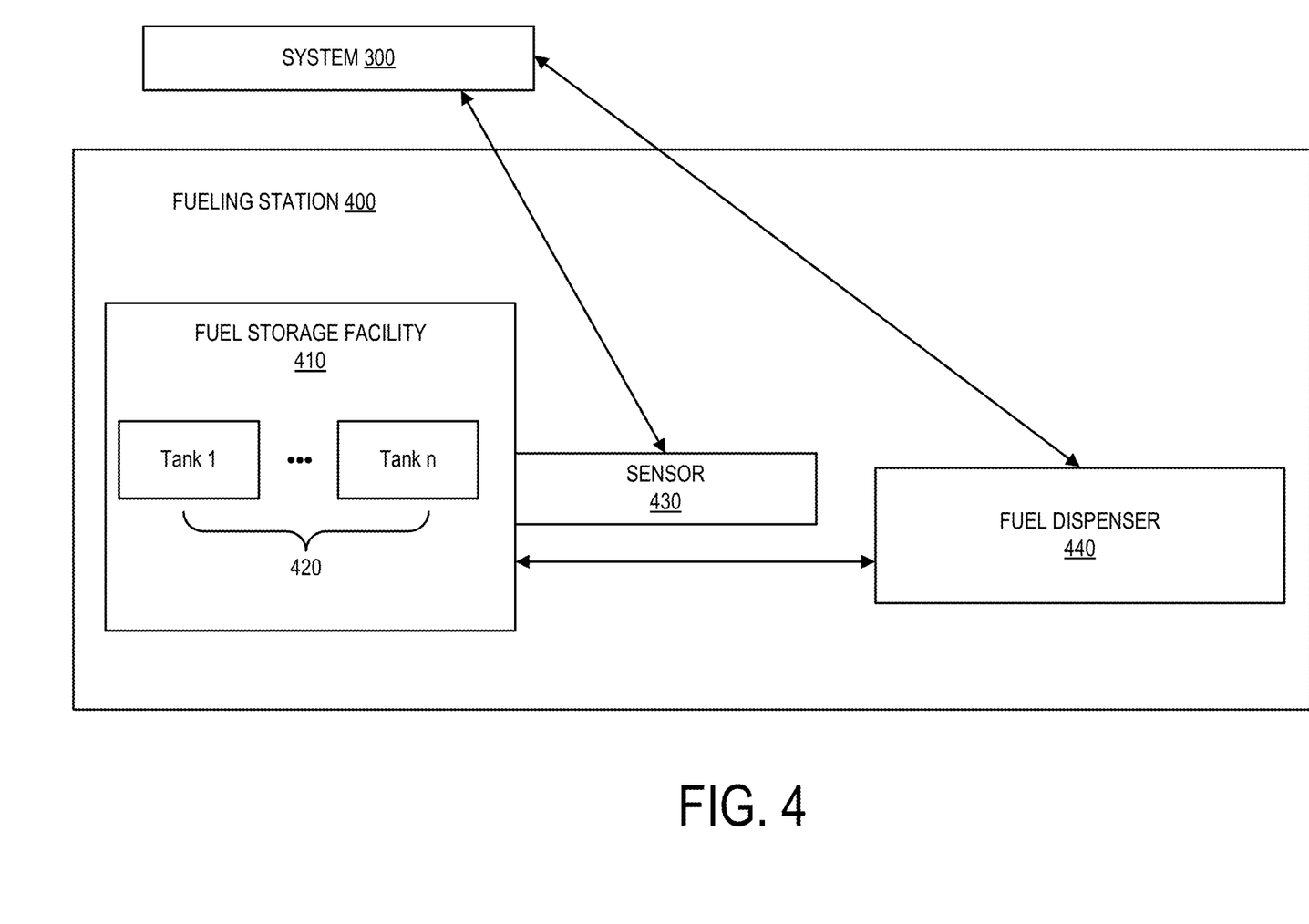
FIG. 4 is a schematic diagram of a fueling station that is in operable communication with the system of FIG. 3.

In some implementations, the current subject matter can be configured to be implemented in a system 300, as shown in FIG. 3. The system 300 can include one or more of a processor 310, a memory 320, a storage device 330, and an input/output device 340. Each of the components 310, 320, 330 and 340 can be interconnected using a system bus 350. The processor 310 can be configured to process instructions for execution within the system 100. In some implementations, the processor 310 can be a single-threaded processor. In alternate implementations, the processor 310 can be a multi-threaded processor. The processor 310 can be further configured to process instructions stored in the memory 320 or on the storage device 330, including receiving or sending information through the input/output device 340. The memory 320 can store information within the system 300. In some implementations, the memory 320 can be a computer-readable medium. In alternate implementations, the memory 320 can be a volatile memory unit. In yet some implementations, the memory 320 can be a non-volatile memory unit. The storage device 330 can be capable of providing mass storage for the system 100. In some implementations, the storage device 330 can be a computer-readable medium. In alternate implementations, the storage device 330 can be a floppy disk device, a hard disk device, an optical disk device, a tape device, non-volatile solid state memory, or any other type of storage device. The input/output device 340 can be configured to provide input/output operations for the system 300. In some implementations, the input/output device 340 can include a keyboard and/or pointing device. In alternate implementations, the input/output device 340 can include a display unit for displaying graphical user interfaces. In some implementations, the system 300 can be in operable communication with one or more components of a fueling station 400, as shown in FIG. 4. The fueling station 400 can include a fuel storage facility 410, which may include one or more fuel tanks 420 disposed in the ground at the fueling station 400 that are configured to hold fuel at the fueling station 400. The one or more fuel tanks 420 of the fuel storage facility 410 can be in operable communication with one or more sensors 430 that are located proximate the fuel storage facility 410 and configured to acquire data characterizing the fuel stored in the one or more fuel tanks 420, the one or more fuel tanks 420, and the fuel storage facility 410. The one or more sensors 430 can also be in operable communication with the system 300 such that the system 300 can receive the acquired data for use in determining the predicted fuel leakage rate and the fuel leak prediction.

The one or more fuel tanks 420 of the fuel storage facility 410 can also be in fluid and operable communication with a fuel dispenser 440, which can dispense the fuel contained in the one or more fuel tanks to a customer. The fuel dispenser 440 can be in operable communication with the system 300 such that the system 300 can receive data from the fuel dispenser 440 pertaining to the sale of fuel to the customer for use in determining the predicted fuel leakage rate and the fuel leak prediction.

It should be noted that the steps shown in FIGS. 1-4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, the SIR system as discussed herein can combine all known alerts and data points, site equipment, and infrastructure details into a model to provide a user with the predicted fuel leakage rate and the fuel leak prediction. By applying artificial intelligence and machine learning techniques to provide model and parameter recommendations, wetstock management can be performed more efficiently, thereby saving costs and improving safety.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
   receiving, from one or more of a plurality of sensors disposed in a fuel storage facility, data characterizing the fuel storage facility;
   determining, by a server and based on the received data, a predicted fuel leakage rate for the fuel storage facility, the determining further based on at least one predictive model that predicts whether a fuel leak exists in the fuel storage facility;
   determining, by a server and based on whether a predicted fuel leakage rate exceeds a first, second, and/or third threshold, a fuel leak prediction for the fuel storage facility; and
   providing, by the server, the fuel leak prediction,
   wherein the predicted fuel leakage rate being:
      less than the first threshold indicates a non-leaking fuel storage facility,
      greater than the first threshold but less than the second threshold indicates a leaking storage facility, and
      greater than the second threshold and the third threshold indicates an inconclusive prediction.

2. The method of claim 1, wherein the at least one predictive model includes a predetermined calibration parameter for the fuel storage facility, a physics model for the fuel storage facility, and an error model indicative of at least one degree of error in the data.

3. The method of claim 2, wherein the determining of the predicted fuel leakage rate is further based on
   the predetermined calibration parameter for the fuel storage facility, the physics model, and an optimization of the error model.

4. The method of claim 3, wherein the fluid balance model determines a predicted fuel level for the fuel storage facility based on the received data.

5. The method of claim 3, further comprising:
   providing, by the server, the predicted fuel leakage rate to a graphical user interface for depiction on a display.

6. The method of claim 3, further comprising:
   determining a second fuel leak prediction for the fuel storage facility based on a second fluid balance model and a second predetermined threshold, the second fluid balance model based on the fluid balance model and the second predetermined threshold greater than the predetermined threshold.

7. The method of claim 3, wherein the determining of the fuel leak prediction is further based on mathematical programing and includes maximizing or minimizing a function characterized by the physics model and by at least varying input values of the function, the input valves characterizing the received data, and computing an output value of the function, the output value characterizing the predicted fuel leakage rate.

8. The method of claim 3, further comprising determining a source of the fuel leak based on the predicted fuel leakage rate, the fuel leak prediction, and the received data.

9. The method of claim 2, wherein the physics model is a fluid balance model.

10. The method of claim 1, wherein the one or more of the plurality of sensors includes any one of a dipstick, an automated tank gauge, a fuel leak detection sensor, a magnetostrictive probe, a point of sale device, a forecourt controller, a back office system, and a fuel dispenser.

11. The method of claim 1, wherein the server is communicatively coupled to the one or more of the plurality of sensors.

12. The method of claim 1, wherein the fuel leak prediction is a daily fuel leak prediction.

13. The method of claim 1, wherein the fuel leak prediction is provided to a graphical user interface of a display communicatively coupled to the server, the graphical user interface configured to present a visual characterization of the fuel leak prediction on the display.

14. The method of claim 1, wherein the fuel leak prediction is provided to an automatic tank gauge for display to a user.

15. The method of claim 1, further comprising determining the fuel leak prediction at a repeatable time interval.

16. A system comprising:
   at least one data processor; and
   memory storing instructions configured to cause the at least one data processor to perform operations comprising:
      receiving, from one or more of a plurality of sensors disposed in a fuel storage facility, data characterizing the fuel storage facility;
      determining, based on the received data, a predicted fuel leakage rate for the fuel storage facility, the determining further based on at least one predictive model that predicts whether a fuel leak exists in the fuel storage facility;
      determining, based on whether a predicted fuel leakage rate exceeds a first, second, and/or third threshold; and providing the fuel leak prediction,
wherein the predicted fuel leakage rate being:
    less than the first threshold indicates a non-leaking fuel storage facility,
    greater than the first threshold but less than the second threshold indicates a leaking storage facility, and
    greater than the second threshold and the third threshold indicates an inconclusive prediction.

17. The system of claim 16, wherein the at least one predictive model includes a predetermined calibration parameter for the fuel storage facility, a physics model for the fuel storage facility, and an error model indicative of at least one degree of error in the data.

18. The system of claim 17, wherein the determining of the predicted fuel leakage rate is further based on
    the predetermined calibration parameter for the fuel storage facility, the physics model, and an optimization of the error model.

19. The system of claim 18, wherein the fluid balance model determines a predicted fuel level for the fuel storage facility based on the received data.

20. The system of claim 18, further comprising:
    providing the predicted fuel leakage rate to a graphical user interface for depiction on a display.

21. The system of claim 18, further comprising:
    determining a second fuel leak prediction for the fuel storage facility based on a second fluid balance model and a second predetermined threshold, the second fluid balance model based on the fluid balance model and the second predetermined threshold greater than the predetermined threshold.

22. The system of claim 18, wherein the determining of the fuel leak prediction is further based on mathematical programing and includes maximizing or minimizing a function characterized by the physics model and by at least varying input values of the function, the input valves characterizing the received data, and computing an output value of the function, the output value characterizing the predicted fuel leakage rate.

23. The system of claim 18, further comprising determining a source of the fuel leak based on the predicted fuel leakage rate, the fuel leak prediction, and the received data.

24. The system of claim 17, wherein the physics model is a fluid balance model.

25. The system of claim 16, wherein the one or more of the plurality of sensors includes any one of a dipstick, an automated tank gauge, a fuel leak detection sensor, a magnetostrictive probe, a point of sale device, a forecourt controller, a back office system, and a fuel dispenser.

26. The system of claim 16, wherein the at least one data processor is communicatively coupled to the one or more of the plurality of sensors.

27. The system of claim 16, wherein the fuel leak prediction is a daily fuel leak prediction.

28. The system of claim 16, wherein the fuel leak prediction is provided to a graphical user interface of a display communicatively coupled to the at least one data processor, the graphical user interface configured to present a visual characterization of the fuel leak prediction on the display.

29. The system of claim 16, wherein the fuel leak prediction is provided to an automatic tank gauge for display to a user.

30. The system of claim 16, further comprising determining the fuel leak prediction at a repeatable time interval.

31. A non-transitory computer program product storing instructions which, when executed by at least one data processor forming part of at least one computing system, cause the at least one data processor to implement operations comprising:
    receiving, from one or more of a plurality of sensors disposed in a fuel storage facility, data characterizing the fuel storage facility;
    determining, based on the received data, a predicted fuel leakage rate for the fuel storage facility, the determining further based on at least one predictive model that predicts whether a fuel leak exists in the fuel storage facility;
    determining, based on weather a predicted fuel leakage rate exceeds a first, second, and/or third threshold; and
    providing the fuel leak prediction,
    wherein the predicted fuel leakage rate being:
        less than the first threshold indicates a non-leaking fuel storage facility,
        greater than the first threshold but less than the second threshold indicates a leaking storage facility, and
        greater than the second threshold and the third threshold indicates an inconclusive prediction.

* * * * *

UNITED STATES PATENT AND TRADEMARK OFFICE
CERTIFICATE OF CORRECTION

PATENT NO. : 11,852,563 B2
APPLICATION NO. : 17/027529
DATED : December 26, 2023
INVENTOR(S) : Prem Swaroop et al.

It is certified that error appears in the above-identified patent and that said Letters Patent is hereby corrected as shown below:

In the Claims

Column 13, Claim 1, Line 51, delete "a predicted" and replace with --the predicted--;

Column 14, Claim 16, Line 65, delete "a" and replace with --the--;

Column 16, Claim 31, Line 34, delete "weather," and replace with --whether--;

Column 16, Claim 31, Line 34, delete "a" and replace with --the--.

Signed and Sealed this
Second Day of July, 2024

Katherine Kelly Vidal
*Director of the United States Patent and Trademark Office*